United States Patent [19]

Stewart, Jr. et al.

[11] Patent Number: 5,309,708

[45] Date of Patent: May 10, 1994

[54] MULTIFUNCTION INTEGRATED POWER UNIT

[75] Inventors: Donald B. Stewart, Jr.; James A. Rhoden, both Phoenix, Ariz.

[73] Assignee: AlliedSignal Inc., Morris Township, Morris County, N.J.

[21] Appl. No.: 202,723

[22] Filed: Jun. 3, 1988

[51] Int. Cl.⁵ .............................................. F02C 7/268
[52] U.S. Cl. ............................... 60/39.142; 60/39.15
[58] Field of Search ............ 60/39.07, 39.141, 39.142, 60/39.15, 39.33; 192/42

[56] References Cited

U.S. PATENT DOCUMENTS

| | | | |
|---|---|---|---|
| 2,611,239 | 9/1952 | Briggs | 60/39.27 |
| 2,643,511 | 6/1953 | Briggs | 60/39.142 |
| 3,416,309 | 12/1968 | Elmes et al. | 60/39.142 |
| 3,965,673 | 6/1976 | Friedrich | 60/39.15 |
| 4,077,202 | 3/1978 | Schutze | 60/39.142 |
| 4,514,926 | 5/1985 | Christoff | 60/39.07 |
| 4,777,793 | 10/1988 | Weingard et al. | 60/39.142 |
| 4,815,277 | 3/1989 | Vershure, Jr. et al. | 60/39.142 |

Primary Examiner—Louis J. Casaregola
Attorney, Agent, or Firm—Terry L. Miller; Jerry J. Holden; Robert A. Walsh

[57] ABSTRACT

A multifunction integrated power unit (MIPU) for use aboard aircraft provides the functions both of an auxiliary power unit and of an emergency power unit while being smaller, lighter, and less expensive than the two units it replaces. Additionally, the integration of both functions in a single unit allows elimination of duplicated service devices and a further reduction in size, cost, and weight in the aircraft itself. The MIPU includes two turbine engines operable under differing conditions, an integrating gear box receiving power from the two engines selectively, and a plurality of accessory devices receiving shaft power from either of the two engines via the gear box.

22 Claims, 6 Drawing Sheets

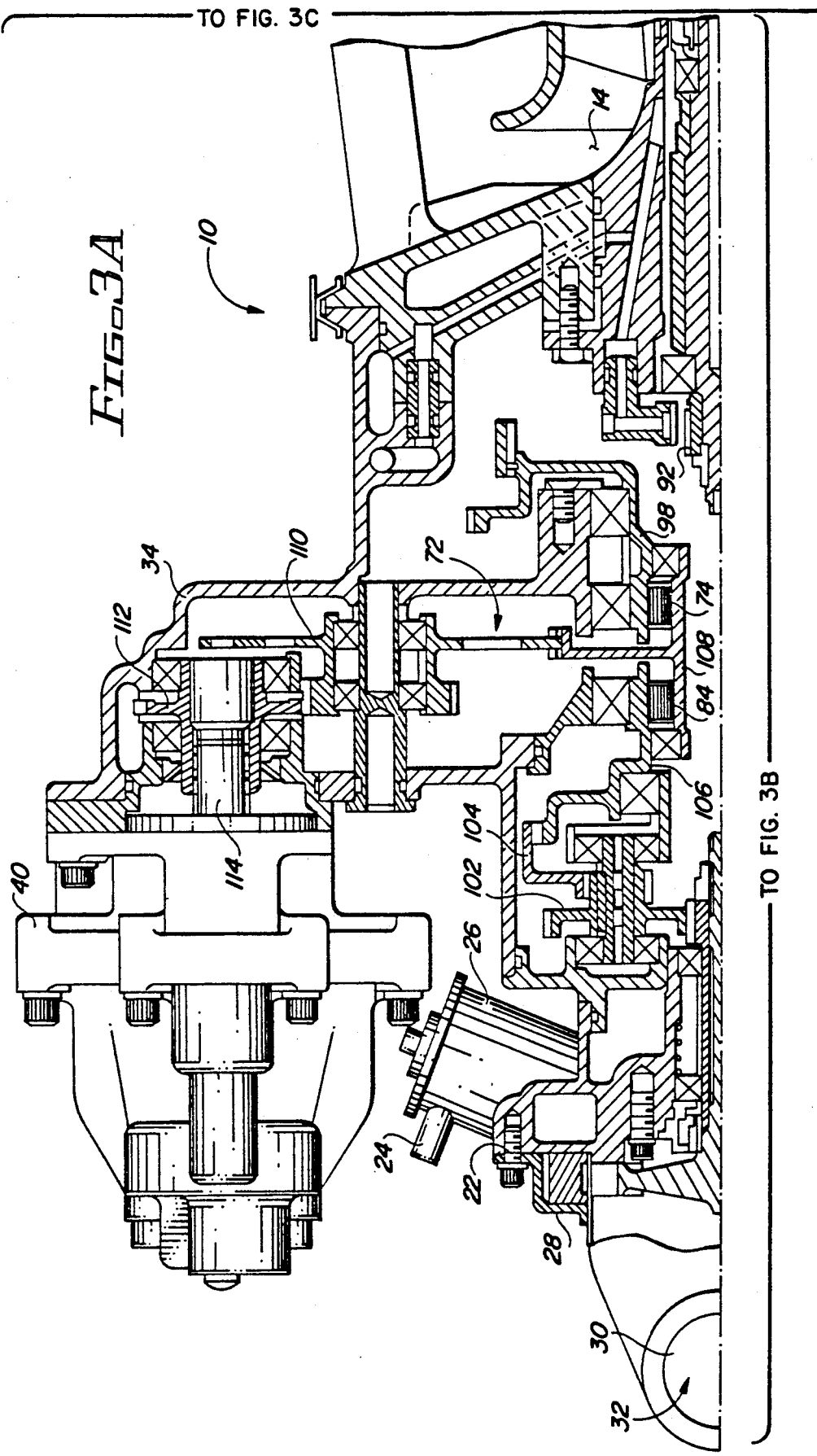

—FROM FIG. 3A & 3B—

TO FIG. 4B

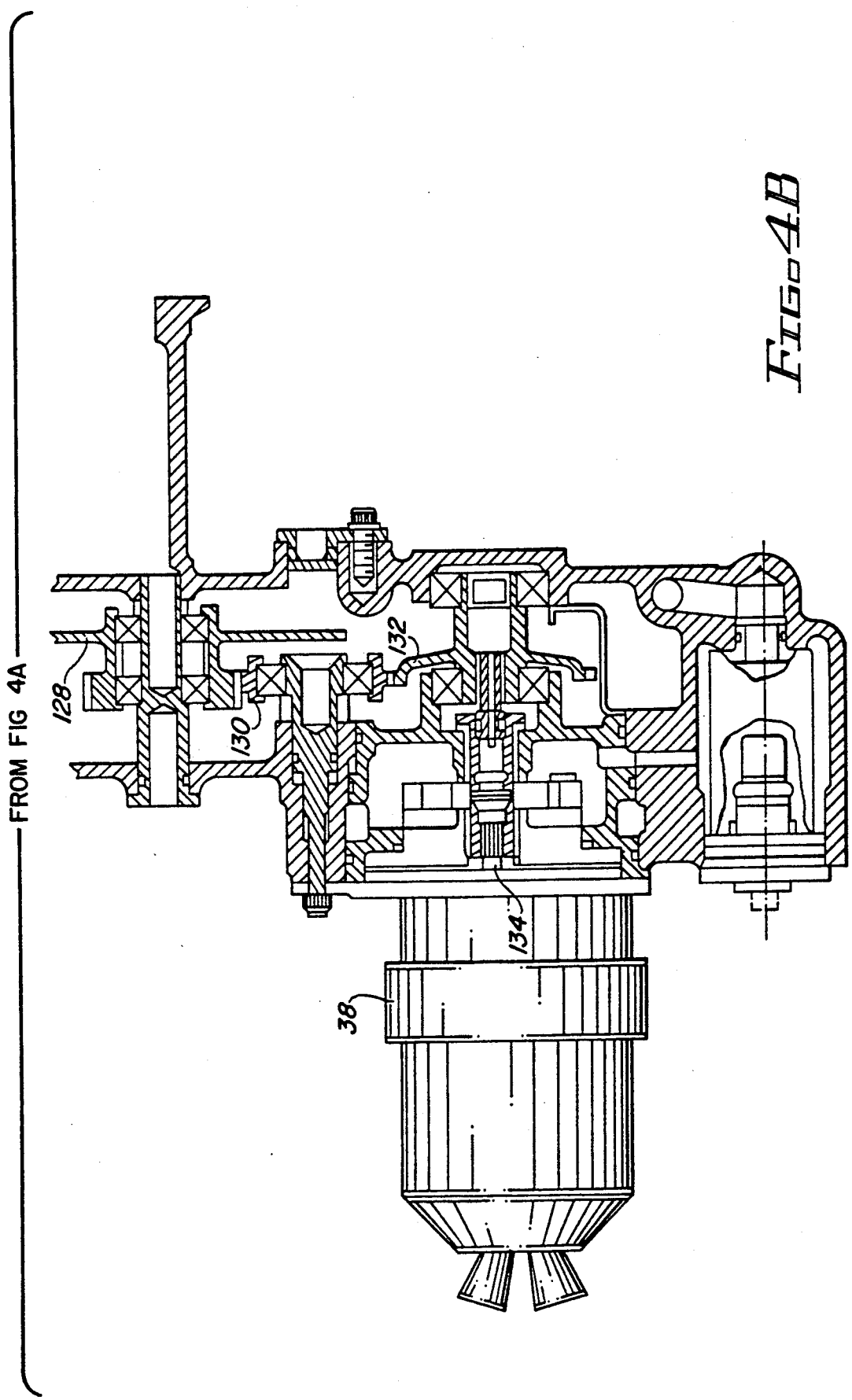

MULTIFUNCTION INTEGRATED POWER UNIT

TECHNICAL FIELD

The present invention is in the technical field of auxiliary power units (APU) and emergency power units (EPU) for aircraft. More particularly, the present invention relates to an integrated power unit which combines the functions of an auxiliary power unit and of an emergency power unit into a single unit. The integrated power unit may perform either function, and transition between functions, while affording a smaller and lighter apparatus than the total of the two units which it replaces. Additionally, the present invention affords several simplifications in aircraft apparatus in comparison with that required when two separate units are employed to provide the functions of supplying auxiliary power and emergency power to the aircraft.

BACKGROUND OF THE INVENTION

Conventional turbine engine auxiliary power units are well known in the aerospace technologies. These units are used to provide power to the aircraft either on the ground or in flight, or both. This power may be provided in the form of one or more of electrical power, hydraulic power, pressurized air, or another form, according to the requirements of the aircraft in which the APU is installed. Unfortunately, starting of an APU may require from many seconds to as much as a few minutes. During this starting time power from the APU is, of course, not available to the aircraft. As a result, some essential aircraft systems may not be operated during starting of the APU. Also, if the aircraft is above a determined altitude, it is not possible to start the APU because of low ambient pressure. An aircraft with only an APU may require some other system, such as an EPU or a ram air turbine, to provide power to the aircraft until the APU can be started.

Similarly, EPU's are known which employ a hydrazine decomposition chamber, for example, or a jet fuel combustor to provide a flow of high temperature pressurized motive gas to a turbine. The turbine is employed to drive a hydraulic pump or electric generator, for example. The EPU is employed to provide hydraulic or electric power (or both) on a relatively short term basis after a failure of an essential system associated with the aircraft main engines. This emergency power supply allows continuation of controlled aircraft flight for a limited time while the aircraft is brought to a landing or to an altitude low enough to allow starting of the aircraft APU.

The development of unstable aircraft has in particular increased the necessity for providing a rapidly available source of emergency power. Upon a failure of the main hydraulic pump, or main generator, or of the aircraft propulsion engine driving these devices, the aircraft cannot be maintained in controlled flight. Without hydraulic power to move aircraft control surfaces, or electrical power for flight control computers, the unstable aircraft is uncontrollable. Thus, these aircraft must have a source of emergency power which is available almost immediately after the failure of a flight control related power system. Unfortunately, the conventional technology for this purpose employs hydrazine fuel and a decomposition chamber containing a catalytic reaction bed. When such an EPU is operated, even for a short time, the toxic hydrazine must be flushed from the aircraft system using neutralizing chemicals, and the decomposition chamber must be replaced.

As a result, a transient in the aircraft systems, for example, which does not represent a genuine emergency, but which exercises the EPU can be very expensive. Also, this type of unnecessary exercise of the EPU may compromise the availability of the EPU for operation were a genuine emergency to occur. As a result, EPU's which employ hydrazine and a decomposition chamber are widely recognized as an unsatisfactory solution to the need for an emergency power supply aboard aircraft.

Additional shortcomings of conventional technology which provides both an APU and a separate EPU are that the weight, size, fuel consumption, complexity, cost and maintenance requirements of the aircraft are all increased while the performance of the aircraft is decreased.

SUMMARY OF THE INVENTION

In view of the recognized deficiencies of conventional technology in the aircraft APU and EPU fields, it is an object for this invention to provide a multifunction integrated power unit (MIPU) which performs the functions of an APU and an EPU, while being smaller and lighter in weight than the total of the two conventional units which it replaces.

An additional object is to provide a MIPU of the above-described character which does not require hydrazine or other similar toxic or unstable chemical for its operation.

Still another object for the present invention is to provide a MIPU having both APU and EPU functions while using only a single fuel.

Yet another object for the present invention is to provide a MIPU combining functions of an EPU and an APU and which can transition from one function to the other with no interruption in power supply to the aircraft.

Accordingly, the present invention provides a multifunction integrated power unit including a first combustion turbine engine having a rotatable compressor inducting and pressurizing ambient air, a first combustor receiving said pressurized air along with a supply of fuel to support combustion producing a first flow of high temperature pressurized combustion products, a first turbine expanding said first flow of high temperature pressurized combustion products to a lower temperature and pressure to rotatively drive said compressor and a first output shaft, a second combustion turbine engine including a combustor for receiving pressurized air from a storage source thereof along with a separate supply of said fuel to support combustion producing a second flow of high temperature pressurized combustion products, a second turbine expanding said second flow of combustion products to a lower temperature and pressure to rotatably drive a second output shaft, integrating gear train means coupling with both said first output shaft and said second output shaft for rotatably receiving power input from the one of said first output shaft and said second output shaft having the higher rotational speed while substantially not transferring power from said one output shaft to the other of said first output shaft and said second output shaft, a plurality of power consuming accessory devices operatively associating with said integrating gear train means to rotatably receive power therefrom, said plurality of accessory devices including selectively operable means for receiving ambient air and delivering said air pressurized to said storage source; and control means for selectively operating both said first combustion turbine engine and said second combustion turbine engine, and either one of said engines alone, while selecting the one of said first and second engines to have the higher rotational speed at the respective output shaft thereof.

An advantage of the present invention is that the MIPU may operate on the same jet fuel used in the propulsion engine of the aircraft to provide both EPU and APU functions.

Additional advantages provided by the MIPU of the present invention is the reduction in size, weight, cost, complexity, and maintenance requirements made possible in the aircraft itself resulting from the use of the MTPU rather than separate EPU and APU units.

Additional objects and advantages of the present invention will appear from a reading of the following detailed description of a single preferred embodiment of the invention taken in conjunction with the appended drawing figures, in which:

BRIEF DESCRIPTION OF THE DRAWINGS

FIGS. 3A, 3B, and 3C in conjunction provide a longitudinal partially cross sectional view of the MIPU depicted in FIG. 1, and generally taken along the plane established by lines 3—3 thereof; and FIGS. 4A and 4B in conjunction provide a fragmentary longitudinal partially cross sectional view of the MIPU depicted in FIG. 1, and generally taken along line 4—4 thereof.

DESCRIPTION OF THE PREFERRED EMBODIMENT

Figure 1:
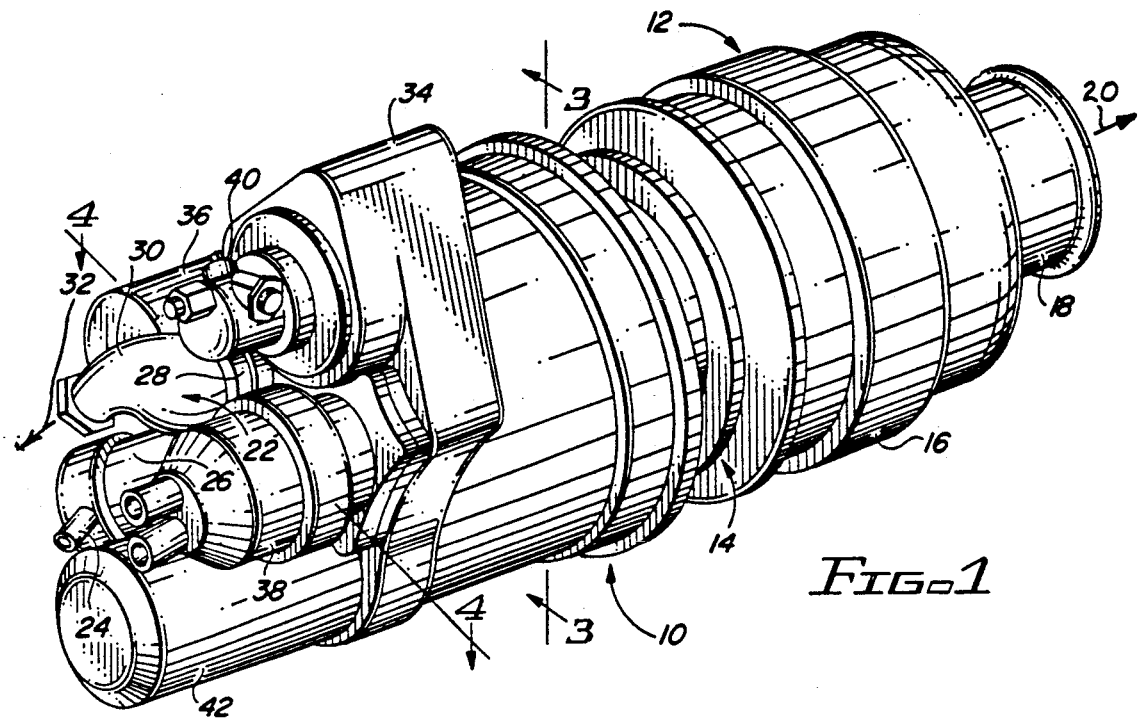
FIG. 1 presents a perspective view of a multifunction integrated power unit (MIPU) embodying the present invention.

FIG. 1 depicts a multifunction integrated power unit (MIPU) (10). The MIPU (10) includes a combustion turbine engine portion generally referenced with the numeral (12) having an annular air intake opening (14), a combustor section (16), and an exhaust duct section (18). When operating, the engine portion (12) inducts ambient air via inlet (14), employs this air pressurized along with a supply of jet engine fuel to support combustion within combustor section (16), and discharges the combustion products from duct section (18), as depicted by arrow (20). Thus, it will be understood that the engine section (12) provides shaft power via a respective output shaft (not visible viewing FIG. 1).

The MIPU (10) also includes a second combustion turbine engine portion (22). The engine portion (22) includes an air inlet section (24), a combustor section (26), and a turbine housing section (28), and an exhaust outlet section (30). During operation, the second combustion turbine portion (22) receives pressurized air from a source thereof (not shown in FIG. 1) and employs this air along with a supply of jet engine fuel to support combustion in combustor section (26). The combustion products from combustor section (26) flow through turbine housing section (28) and are discharged from exhaust outlet (30), as depicted by arrow (32). Accordingly, it is to be understood that the second combustion turbine engine portion (22) also provides shaft power at a respective output shaft thereof (also not visible viewing FIG. 1).

Additionally, the MIPU (10) includes an integrating gear box portion (34) disposed between the first engine portion (12) and the second engine portion (22). Additional description of the gear box portion (34) is provided below. However, in overview, the gear box portion (34) operatively associates with both of the power output shafts of the engine portions (12) and (22) in order to receive shaft power from either engine portion.

Finally, the MIPU (10) includes a plurality of shaft power consuming accessory devices mounted to the gear box (34) and rotatively driven thereby. These power consuming devices include an electrical generator (36), a first hydraulic pump (38), and a second fluid pump (40). As will be more fully explained hereinbelow, the gear box (34) also carries an air-expansion type of starter motor (42) which is effective for power input to the gear box (34) for starting of the first engine (12).

Figure 2:
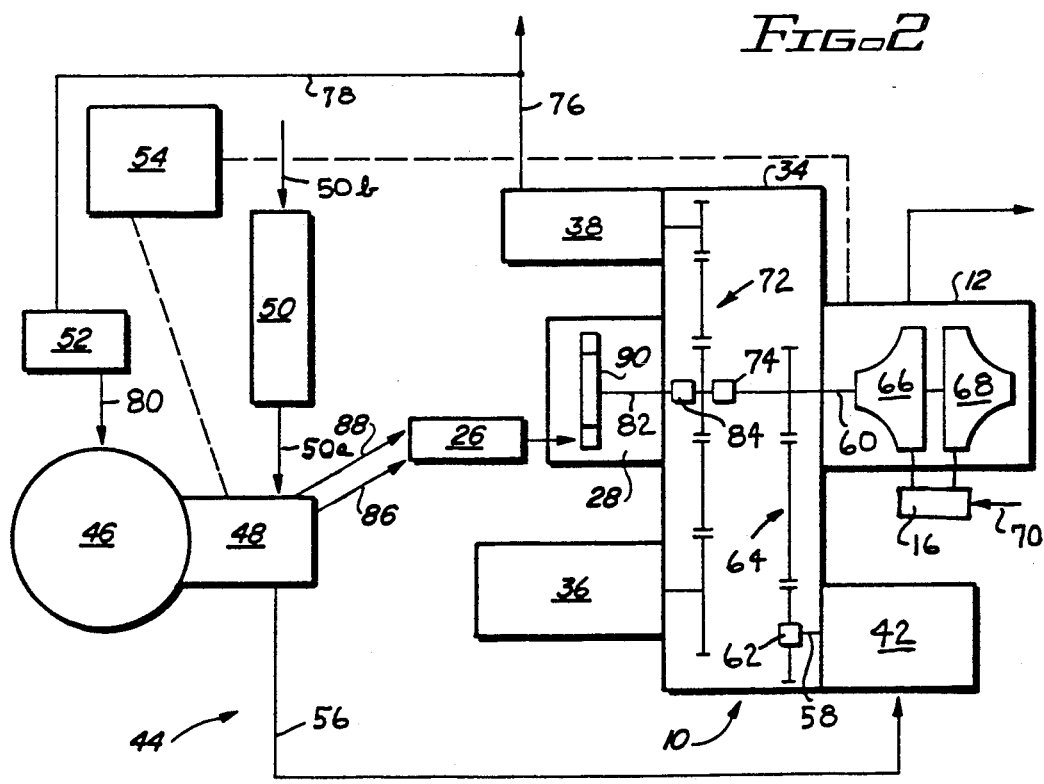
FIG. 2 schematically depicts a MIPU system according to the present invention.

Having received an overview of the MIPU (10), attention may now be directed to a MIPU system (44) depicted schematically in FIG. 2. It is seen that the MIPU system (44) includes a MIPU (10) along with a pressurized air storage chamber (46), a flow control module (48), a pressurized fuel storage chamber (50) communicating with module (48), a hydraulically operated air compressor unit (52), and a system control unit (SCU) (54). It will be recalled that the MIPU (10) is operable to perform the function of an APU, or of an EPU, and to transition from operation as an EPU to operation as an APU. Therefore, the operational modes for the MIPU system (44) are starting and operation as an APU, starting and operation as an EPU, and transition from operation as an EPU to operation as an APU.

Starting of the MIPU (10) as an APU is accomplished under control of the system control unit (SCU) (54). This SCU (54) commands the flow control unit (48) to direct a controlled flow of pressurized air from storage chamber (46) to starter motor (42) via a conduit (56). The starter motor (42) is coupled at an output shaft (58) thereof to a shaft (60) of the first engine (12) via a one way sprag clutch (62) and a gear train (64). The shaft (60) is the output shaft of engine (12) and also drivingly carries a centrifugal compressor rotor (66) and a radial inflow turbine rotor (68). Thus, the first engine (12) is accelerated toward its ignition and self-sustaining speed. As ignition speed for the first engine (12) is approached, the SCU commands provision of a scheduled flow of jet engine fuel to the combustor section (16) of the engine (12) via a conduit (70). This fuel flow along with pressurized air provided by compressor rotor (66) supports combustion to provide a flow of pressurized high temperature combustion products to the turbine rotor (68). The turbine rotor (68) drives the compressor rotor (66) and provides shaft power via shaft (60).

After attaining self-sustaining speed, the first engine (12) accelerates under its own power to its operating speed, and the flow of pressurized air to starter motor (42) is discontinued by the SCU (54). Clutch (62) insures that starter (42) is not driven by engine (12). The engine (12) provides shaft power to a gear train (72) within the gear box (34) via the shaft (60) and an interposed sprag clutch (74). The accessory devices (36), (38) and (40) are drivingly connected to the gear train (72) to receive shaft power therefrom (device (40) not being shown on FIG. 2 in the interest of simplicity of the schematic). Thus, the generator (36) provides electrical power to the aircraft while the hydraulic pump (38) provides hydraulic power via a conduit (76). The fluid pump (40) draws lubricating oil from the interior of gear box (34)

and circulates this oil pressurized to various bearings (also not shown on FIG. 2) of the MIPU (10).

It will be recalled that the MIPU system (44) includes a hydraulically driven air compressor unit (52). After the first engine (12) is started, the air compressor unit (52) is operated under the control of the SCU to recharge the pressurized air storage chamber (46). The compressor unit (52) receives hydraulic power from conduit (76) via a branch conduit (78) and draws in ambient air. This ambient air is delivered pressurized to the chamber (46) via a conduit (80).

It will be seen viewing FIG. 2 that the MIPU (10) also includes a power output shaft (82) associated with the second engine (22). The shaft (82) is connected with gear train (72) via a sprag clutch (84). This clutch (84) insures that engine (12) does not drive the engine (22).

Similarly, starting of the MIPU (10) as an EPU is also accomplished under control of the SCU (54). The SCU (54) commands air flow control unit (48) to direct a controlled flow of pressurized air from the storage chamber (46) to the combustor section (26) of the second engine (22) via a conduit (86) and the air inlet (24) thereof. In a sequenced relationship with this flow of pressurized air to combustor (26), the SCU (54) commands the fuel flow control unit (48) to provide also a scheduled flow of jet engine fuel to the combustor section (26) of engine (22) via a conduit (88). Pressurized jet engine fuel is supplied to the flow control unit (48) by the pressurized fuel storage chamber (50) via a conduit (50a). The fuel storage chamber (50) captively receives jet fuel from the aircraft at a comparatively low pressure via a conduit (50b), after which the chamber is pressurized in preparation for operation of the MIPU system (44) in the EPU mode. This flow of pressurized air and jet fuel to combustor (26) supports combustion producing a flow of pressurized high temperature combustion products. Combustion products flow from combustor (26) across a turbine wheel (90) rotatably carried within the turbine housing section (28) of the engine (22). The turbine wheel (90) is drivingly carried by shaft (82) and delivers shaft power thereto.

Tests of a MIPU embodying the present invention have shown that power is delivered by engine (22) to the gear train (72) and accessories (36–40) in about two seconds after a start command. In this EPU mode of operation, the clutch (74) insures that the engine (22) does not drive engine (12). Also during operation of the MIPU (10) in EPU mode, the air compressor (52) may be used to recharge air storage chamber (46). However, because the engine (22) is power limited in its driving of the accessories (36–40) and because operation of engine (22) would ordinarily occur at high aircraft altitudes so that recharging of the chamber (46) by pressurizing ambient air would be inefficient, such recharging of chamber (46) is not desirable in EPU mode of operation. Instead, sufficient storage volume is desirably provided in chambers (46) and (50) for all of operation of the MIPU (10) in EPU mode for the period required for aircraft descent to a level allowing starting of engine (12), for the transition from EPU to APU mode, and for a safety margin.

Transition of the MIPU (10) from operation in EPU mode to operation in APU mode is also accomplished under control of SCU (54). With the MIPU (10) operating in EPU mode so that engine (22) is driving the accessories (36-40), a start of engine (12) is commanded. That is, clutch (84) is engaged while clutch (74) is overrunning. As discussed above in connection with the starting of MIPU (10) in APU mode, the air storage chamber (46) supplies pressurized air to starter motor (42). However, in this case the storage chamber (46) is simultaneously supplying pressurized air to combustor section (26) to maintain operation in EPU mode. Starting of the engine (12) proceeds as described above with the exception that when ignition speed of the engine (12) is reached, fuel flow to combustion section (16) is initiated while maintaining flow of pressurized air and fuel to combustion section (26). Upon the engine (12) attaining about ninety-five percent of its rated speed, the SCU (54) commands that the engine (22) be shut down. That is, the flow of pressurized air and fuel to combustor section (26) is shut off. Thereafter, the speed of shaft (82) decreases while that of shaft (60) is increasing. Consequently, the clutches (74) and (84) reverse their roles so that the former is engaged while the latter overruns. The engine (22) coasts to a stop while the engine (12) drives the accessories (36–40). Once this transition to APU mode is completed, the air compressor (52) is employed to recharge storage chamber (46). Also, pressure is vented from pressurized fuel storage chamber (50) so that the latter may be recharged with jet engine fuel at a comparatively low pressure from the aircraft via conduit (50b). Once recharged with fuel the fuel storage chamber (50) is again pressurized by use of pressurized air from chamber (46) in preparation for the next operation of the MIPU (44) in EPU mode.

Figure 3B:
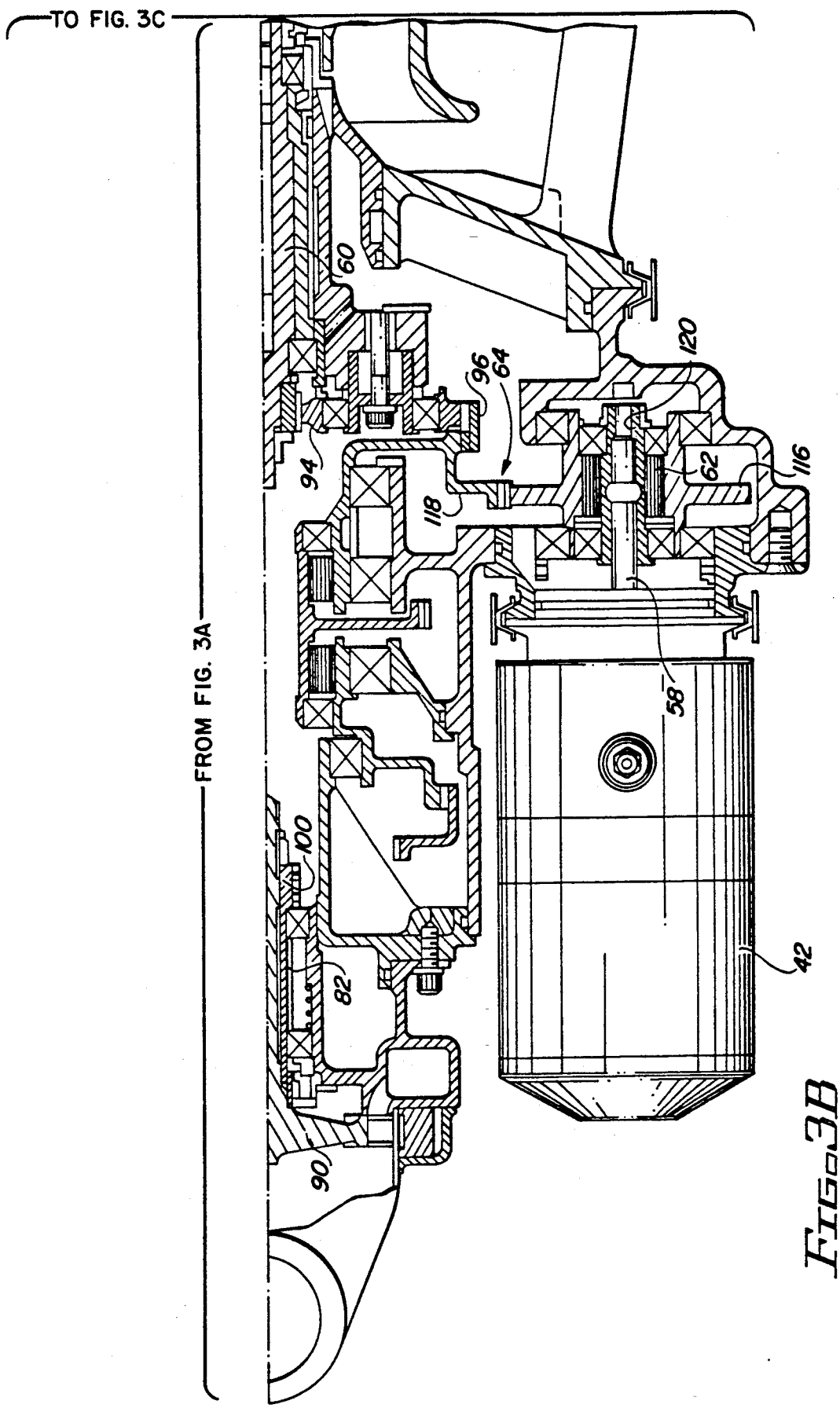
Figure 3C:
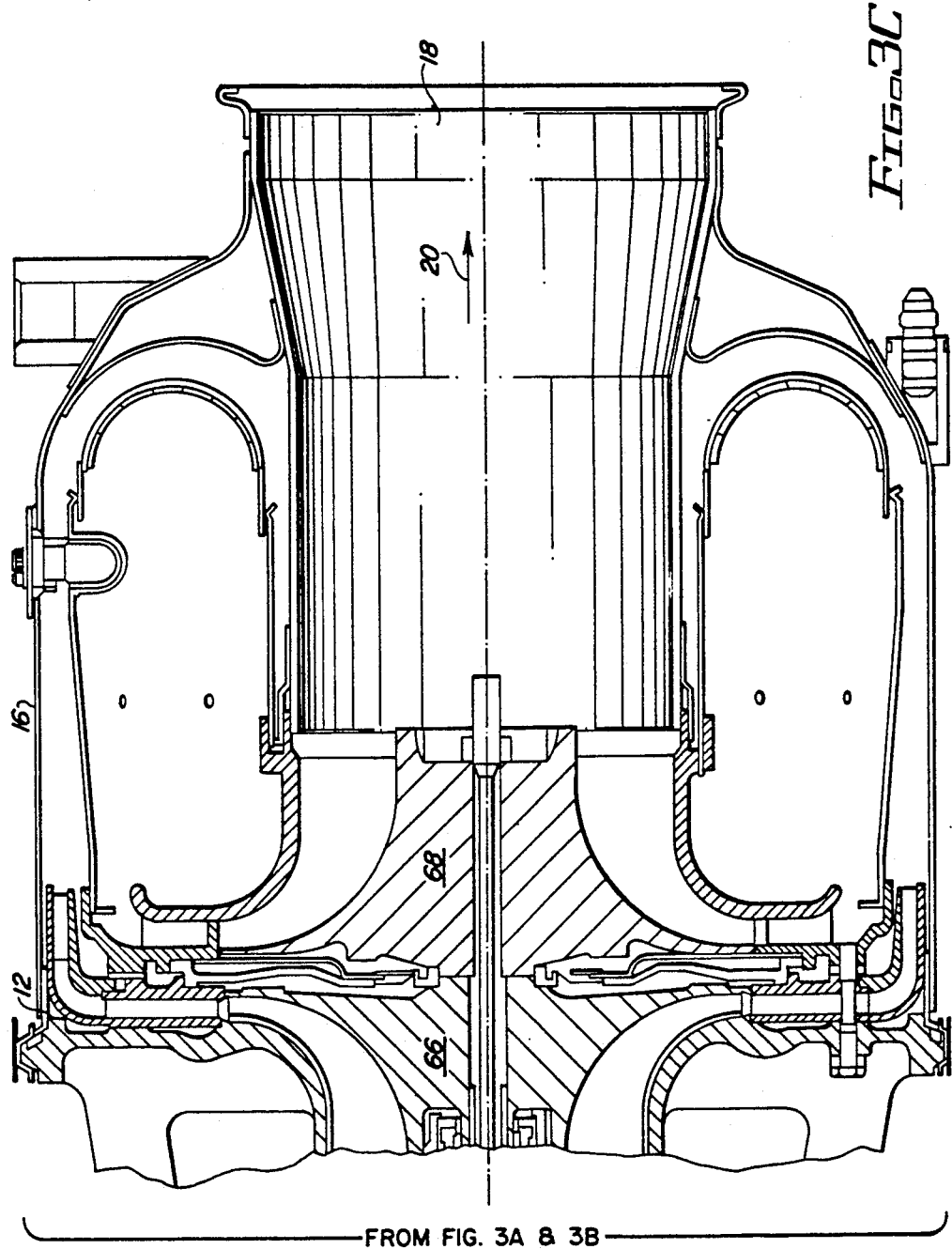

Attention now more particularly to FIGS. 3A, 3B, and 3C in conjunction will show that the MIPU (10) is arranged with the output shaft (60) of engine (12) and the output shaft (82) of engine (22) coaxially aligned with one another. The gear box (34) is received between the engines (12) and (22), while gear train (72) includes a pinion gear (92) drivingly carried by shaft (60), an idler gear (94) meshing with the pinion (92), and a ring gear (96) meshing with the idler gear (94). Ring gear (96) is carried by a first tubular carrier member (98) journaled by the gear box (34) coaxially with the shafts (60) and (82).

Similarly, the gear train (72) also includes a pinion gear (100) drivingly carried by shaft (82), a compound idler gear (102) meshing with the pinion (100), and a ring gear (104) meshing with the idler gear (102). The ring gear (104) is carried by a second tubular carrier member (106) journaled in gear box (34) coaxially with the shafts (60) and (82), and with the first carrier member (98). Relatively rotatively carried by first carrier member (98) and second carrier member (106) is a tubular power distribution gear member (108). The first carrier member (98) and power distribution member (108) cooperate to carry the first sprag clutch (74), while the member (108) cooperates with second carrier member (106) to carry the second sprag clutch (84). It is understood that each of the engines (12) and (22) when driving the accessories (36–40) applies torque rotating power distribution member (108) in the same direction. Consequently, the result of the above construction is that the power distribution gear member (108) may not rotate slower than either one of the carrier members (98) and (106), but may overrun the slower of these two members if driven to a higher speed by the other carrier member.

Meshing with the power distribution gear member (108) is a compound idler gear (110). The idler gear (110) meshes with a driven gear shaft member (112), which drivingly couples with a power input shaft (114) of hydraulic pump (40). Also seen in FIG. 3B is the mesh of a drive gear (116) with a second ring gear (118) carried by carrier member (98). The drive gear (116) is journaled by the gear box (34), and in turn journals a clutch shaft (120). The drive gear (116) and clutch shaft (120) cooperatively carry sprag clutch (62), while the shaft (120) drivingly engages the shaft (58) of starter motor (42). It will be noted viewing FIGS. 3A, 3B, and 3C that the pump (40) and starter (42) are generally disposed diametrically on opposite sides of the second engine (22). Elements (116), (118), and (120) define gear train (64).

Figure 4A:
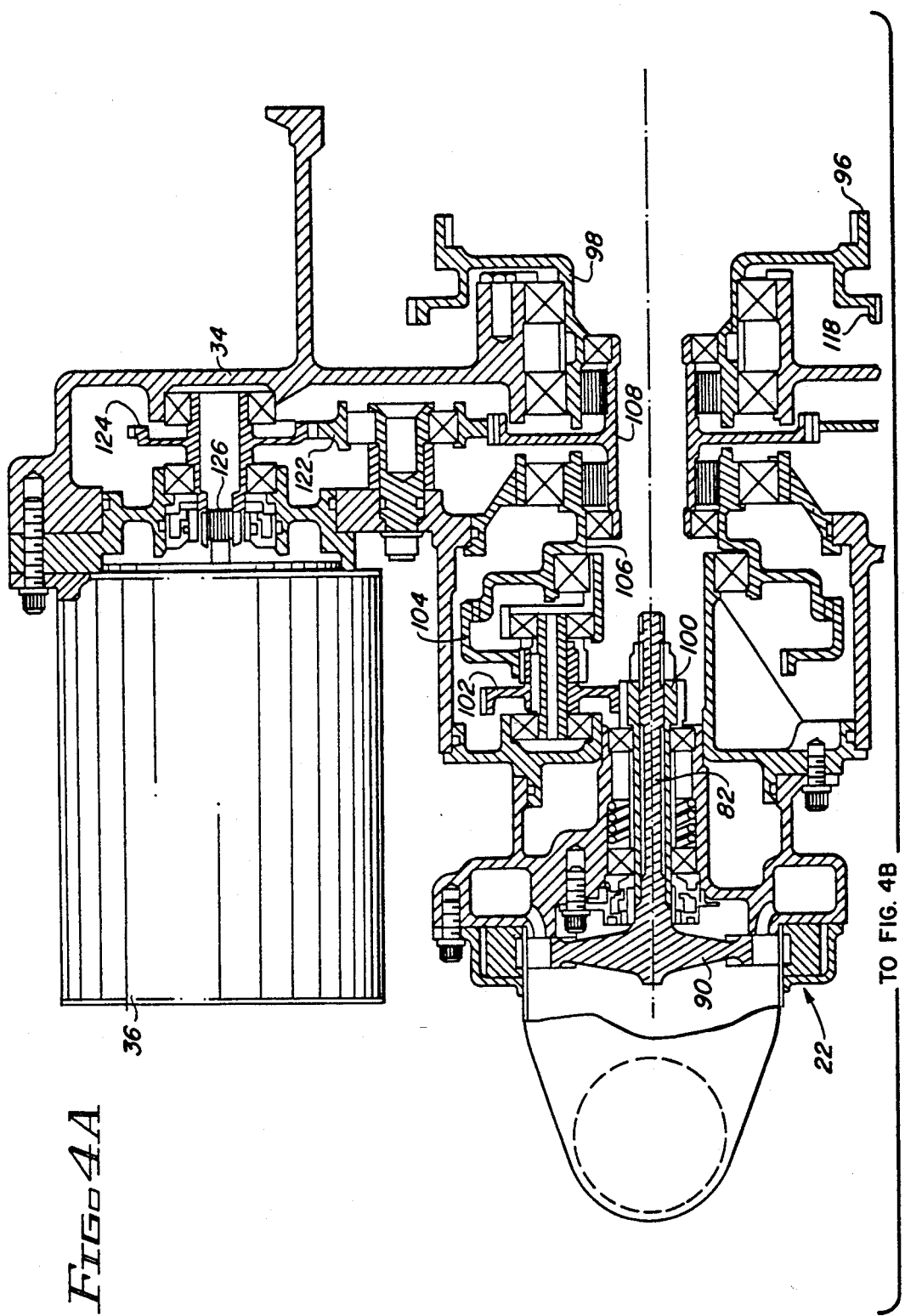

Viewing now FIGS. 4A and 4B it will be seen that the remaining two accessories (36) and (38) are also disposed diametrically on opposite sides of the second engine (22). Thus, the second engine (22) is centrally disposed upon the gear box (34) and is surrounded by the accessories (36–40) and starter motor (440). In order to drive the generator (36), an idler gear (122) meshes with power distribution gear member (108) and with a gear shaft member (124) journaled by the gear box (34). The gear shaft member (124) drivingly couples with drive shaft (126) of generator (36).

Similarly, the hydraulic pump (38) is driven by a compound idler gear (128) meshing with the power distribution gear member (108) and with an idler gear (130). The idler gear (130) meshes with a gear shaft member (132) journaled by the gear box (34). The drive shaft (134) of pump (38) drivingly engages with gear shaft member (132).

In view of the above description of the operation of the MIPU system (44) including MIPU (10), further discussion of the functioning of the apparatus depicted in FIGS. 3A, 3B, 3C, and 4A, 4B, should not be required. Those skilled in the pertinent art will recognize that the MIPU (10) provides a very compact and comparatively lightweight device which is highly desirable in the aerospace art. This MIPU (10) further provides the functions of both an APU and an EPU without the need for hydrazine or similar fuel, and while allowing considerable economics in reduction of size, weight, cost, maintenance, and complexity of an aircraft employing the MIPU.

While the present invention has been depicted and described by reference to one particularly preferred embodiment of the invention, no limitation upon the invention is implied by such reference, and none is to be inferred. The invention is intended to be limited only by the spirit and scope of the appended claims, which provide additional definition of the invention.

What is claimed is:

1. Multi function integrated power unit apparatus comprising; a first combustion turbine engine having a rotary dynamic compressor inducting and pressurizing ambient air, a first combustor receiving said pressurizing air along with a first supply of jet engine fuel to support combustion producing a first flow of motive gas, a first turbine expanding said first flow of motive gas substantially completely to ambient to rotatably drive only said compressor and a first rotatable power output shaft, a second combustion turbine engine including an inlet for receiving pressurized air from a storage source thereof, a second combustor receiving said pressurized air from said storage source via said inlet along with a second supply of jet engine fuel from a respective fuel storage source dedicated only to said integrated power unit to support combustion producing a second flow of motive gas, a second turbine expanding said second flow of motive gas substantially completely to ambient to rotatably drive only a second power output shaft, a plurality of accessory devices for consuming all shaft power from said power output shafts, gear train means drivingly connecting said plurality of accessory devices for delivery of shaft power thereto only from said first power output shaft and said second power output shaft, and one-way overrunning clutch means for drivingly connecting the one of said first power output shaft and said second power output shaft having the higher rotational speed to drive said gear train means while overrunning with respect to the other of said first power output shaft and said second power output shaft.

2. The invention of claim 1 wherein said one-way overrunning clutch means includes a first one-way overrunning clutch disposed in driving connection between said first power output shaft and a first element of said gear train means.

3. The invention of claim 2 wherein said one-way overrunning clutch means further includes a second one-way overrunning clutch disposed in driving connection between said second power output shaft and a second gear element of said gear train means.

4. The invention of claim 3 wherein said gear train means includes a power distribution gear member defining both said first element and said second gear element.

5. The invention of claim I wherein said first power output shaft and said second power output shaft are mutually coaxial.

6. The invention of claim 5 wherein said apparatus includes a power distribution gear member in driving connection with both said first power output shaft and said second power output shaft via said one way clutch means, said power distribution gear member being mutually coaxial with said first power output shaft and said second power output shaft.

7. Multi function integrated power unit apparatus comprising; a first combustion turbine engine having a rotary dynamic compressor inducting and pressurizing ambient air, a first combustor receiving said pressurized air along with a first supply of jet engine fuel to support combustion producing a first flow of motive gas, a first turbine expanding said first flow of motive gas to ambient to rotatably drive said compressor and a first rotatable power output shaft, a second combustion turbine engine including an inlet for receiving pressurized air from a source thereof, a second combustor receiving said pressurized air from said inlet along with a second supply of jet engine fuel to support combustion producing a second flow of motive gas, a second turbine expanding said second flow of motive gas to ambient to rotatably drive a second power output shaft, a plurality of accessory devices for consuming shaft power, gear train means drivingly connecting said plurality of accessory devices for delivery of shaft power thereto from said first power output shaft and said second power output shaft, and one-way overrunning clutch means for drivingly connecting the one of said first power output shaft and said second power output shaft having the higher rotational speed to drive said gear train means while overrunning with respect to the other of said first power output shaft and said second power output shaft, wherein said first power output shaft and said second power output shaft are mutually coaxial, wherein said apparatus includes a power distribution gear member in driving connection with both said first power output shaft and said second power output shaft via said one way clutch means, said power distribution gear member being mutually coaxial with said first power output shaft and said second power output shaft, wherein said gear train means includes a gear box housing, a first speed reduction gear member coupled by gear mesh with said first power output shaft for rotation at a relatively reduced speed in response to rotation of the latter, a second speed reduction gear member coupled by gear mesh with said second power output shaft for rotation at a relatively reduced speed in response to rotation of the latter, said gear box housing journalling said first speed reduction gear member and said second speed reduction gear member coaxially with said first power output shaft, said first speed reduction gear member and said second speed reduction gear member cooperatively journalling said power distribution gear member for independent rotation relative thereto.

8. The invention of claim 7 wherein said first speed reduction gear member and said second speed reduction gear member cooperatively rotatably carry said one-way overrunning clutch means operatively disposed between each of the latter and said power distribution gear member.

9. The invention of claim 8 wherein said one-way overrunning clutch means includes a first sprag clutch disposal in operative relationship between said first speed reduction gear member and said power distribution gear member, and a second sprag clutch disposed in operative relationship between said second speed reduction gear member and said power distribution gear member.

10. The invention of claim 9 wherein said first sprag clutch and said second sprag clutch are like disposed to drive said power distribution gear member in a certain rotational direction in response to driving rotation of the respective speed reduction gear member, and to allow overrunning of said power distribution gear member in said certain rotational direction relative to each of said first speed reduction gear member and said second speed reduction gear member.

11. The invention of claim 10 wherein said gear train means includes a first pinion gear drivingly carried by said first power output shaft, a first idler gear journaled by a housing of said first combustion turbine engine, and a first ring gear carried by said first speed reduction gear member.

12. The invention of claim 11 wherein said first speed reduction gear member also carries a second ring gear member, a starting gear member meshing with said second ring gear member, and starting motor means drivingly coupling with said starting gear member.

13. The invention of claim 12 further including a starting one-way overrunning clutch in driving connection between a power output shaft of said starting motor means and said starting gear member.

14. The invention of claim 13 wherein said starting one-way overrunning clutch is of the sprag type.

15. A multifunction integrated power unit system comprising:
a first combustion turbine engine having a dynamic compressor inducting and pressurizing ambient air, a first combustor receiving said pressurized air along with a supply of fuel to support combustion producing a first flow of high temperature pressurized motive gas, a first turbine expanding said first flow of motive gas to produce shaft power, said first turbine rotatively driving said dynamic compressor and a first rotatable power output shaft;
a second combustion turbine engine having a storage source of pressurized air, a storage source of pressurized fuel, and a second combustor receiving pressurized air from said storage source thereof along with pressurized fuel from said storage source thereof to support combustion producing a second flow of high temperature pressurized motive gas, a second turbine expanding said second flow of motive gas to rotatively drive a second power output shaft;
a plurality of shaft power consuming accessory devices each having a respective rotatable power input shaft;
gear train means drivingly connecting with each one of said plurality of accessory devices for delivery of shaft power thereto from said first power output shaft and said second power output shaft;
one-way overrunning clutch means for drivingly connecting the one of said first power output shaft and said second power output shaft having the higher rotational speed to said gear train means while simultaneously overrunning with respect to the other of said first power output shaft and said second power output shaft;
air-motor starting means for starting said first combustion turbine engine in response to a flow of pressurized air from said storage source to said air motor starting means;
intermittently operating air compressor means for receiving power from a selected one of said power-consuming accessory devices only during driving thereof by said first combustion turbine engine for recharging said storage source with pressurized air;
flow control means interposing between each of said storage source of pressurized air and said storage source of pressurized fuel and said second combustion chamber for providing a regulated flow of air and fuel therefrom separately to said second combustion chamber in response to a respective input command,; said flow control means also providing a flow of pressurized air from said storage source to said air-motor starting means in response to a respective input command; and
command means for selectively providing said respective input commands to said flow control means.

16. The invention of claim 15 wherein said plurality of accessory devices includes a hydraulic pump, said intermittently operating air compressor means including a hydraulic motor selectively receiving hydraulic power from said hydraulic pump, and an air compressor driven by said hydraulic pump.

17. The invention of claim 16 wherein said command means also includes means for selectively allowing and disallowing said intermittently operating air compressor means to receive hydraulic power from said hydraulic pump.

18. The invention of claim 15 wherein said first power output shaft and said second power output shaft are coaxial with one another.

19. The invention of claim 15 wherein said gear train means includes a first speed reduction gear member coupled by gear mesh with said first power output shaft for rotation at a relatively reduced speed in response to rotation of the latter, a second speed reduction gear member coupled by gear mesh with said second power output shaft for rotation at a relatively reduced speed in response to rotation of the latter, said first speed reduction gear member and said second speed reduction gear member cooperatively carrying said one-way overrunning clutch means.

20. The invention of claim 19 wherein said gear train means includes a power distribution gear member, said first speed reduction gear member and said second speed reduction gear member cooperatively carrying said power distribution gear member for rotation relative thereto.

21. The invention of claim 20 wherein said one-way overrunning clutch means includes a first sprag clutch disposed in driving relationship between said first speed reduction gear member and said power distribution gear member to transmit torque from the former to the latter in a certain direction and to allow the latter to overrun the former in said certain direction, and a second sprag clutch disposed in driving relationship between said second speed reduction gear member and said power distribution gear member to transmit torque therebetween and allow relative overrunning also in said certain direction.

22. An apparatus to provide flight control power to an aircraft separate from a thrust engine of said aircraft and following an in-flight loss of flight control power, and possible thrust engine failure, said apparatus comprising:

an emergency turbine engine means operative for combusting stored compressed air and jet engine fuel each from a respective dedicated storage source thereof and for producing useful mechanical shaft power;

an auxiliary turbine engine means for inductive and compressing ambient air to combust with jet engine fuel for producing useful mechanical shaft power;

a transmission means for receiving shaft power only from said emergency turbine engine means and only from said auxiliary turbine engine means, said transmission means dependent upon speed of operation of said engine means and coupling said shaft power produced by one of said engine means to drive at least one aircraft accessory device producing aircraft flight control power; and control means for sensing aircraft flight control power requirements and for rapidly initiating power production within said emergency turbine engine means upon sensing an aircraft flight control power loss, said control means subsequently initiating power production within said auxiliary turbine engine means.

* * * * *